United States Patent [19]

Wilkinson

[11] Patent Number: 5,627,712

[45] Date of Patent: May 6, 1997

[54] TRANSFORMER DIFFERENTIAL RELAY

[75] Inventor: Stanley B. Wilkinson, Havertown, Pa.

[73] Assignee: General Electric Company, New York, N.Y.

[21] Appl. No.: 511,248

[22] Filed: Apr. 19, 1990

[51] Int. Cl.$^6$ ........................................... H02H 3/00
[52] U.S. Cl. ............................ 361/63; 361/36; 361/87
[58] Field of Search .......................... 361/35, 36, 63, 361/76, 78, 79, 86, 87, 89, 93, 94, 64

[56] References Cited

U.S. PATENT DOCUMENTS

| | | | |
|---|---|---|---|
| 3,657,605 | 4/1972 | Hill | 317/27 |
| 4,204,237 | 5/1980 | Zocholl | 361/36 |
| 4,623,949 | 11/1986 | Salowe et al. | 361/63 |
| 4,697,218 | 9/1987 | Nicolas | 361/87 |
| 4,704,653 | 11/1987 | Li | 361/36 |
| 4,819,119 | 4/1989 | Wilkinson | 361/76 |
| 4,825,327 | 4/1989 | Alexander et al. | 361/82 |
| 5,014,153 | 5/1991 | Wilkerson | 361/36 |

FOREIGN PATENT DOCUMENTS

| | | |
|---|---|---|
| 0045105 | 2/1982 | European Pat. Off. . |
| 0133128 | 2/1985 | European Pat. Off. . |
| 2601524 | 7/1986 | France . |
| 2905195 | 2/1979 | Germany . |
| 1078104 | 8/1967 | United Kingdom . |

OTHER PUBLICATIONS

International Journal of Electronics, vol. 61, No. 4, Oct. 1986, pp. 539–542, London, GB; M.S. Jamil–Asghar: "A Solid State Relay For Transformer Switching".

Semiconductor Products & Solid State Technology, vol. 8, No. 9, Sep. 1965, pp. 27–30, Washington, D.C., US; S.D.T. Robertson: "Solid State Transformer Differential Relay".

*Primary Examiner*—Peter S. Wong
*Assistant Examiner*—Adolf Berhane
*Attorney, Agent, or Firm*—William H. Murray

[57] ABSTRACT

The reliability of transformer differential relays is enhanced by providing a method and apparatus which enable improved discrimination between transformer current differentials due to transformer inrush current and current differentials due the occurrence of an internal fault. This improvement in discrimination is provided by generating a first signal representative of currents flowing in at least two windings of the transformer, a second signal representative of a positive portion of the first signal, and a third signal representative of a negative portions of the first signal. A first output signal is generated when the magnitude of the second signal exceeds a first predetermined value, and a second output signal is generated when the magnitude of the third signal exceeds a second predetermined value. A trip signal is generated upon coincidence of the first and second output signals. Additional operate energy is generated when the magnitude of the absolute value of a vector sum operate signal, representative of the vector sum of currents flowing in at least two windings of the transformer, exceeds a first predetermined magnitude. The additional operate energy is terminated and additional restraint energy is generated when the magnitude of a percentage restraint signal, representative of the absolute values of currents flowing in a least two windings of the transformer, exceeds a second predetermined magnitude for a predetermined period of time.

64 Claims, 5 Drawing Sheets

TRANSFORMER DIFFERENTIAL RELAY

BACKGROUND OF THE INVENTION

This invention relates to protective relay circuits for use in AC power distribution systems and more particularly to transformer differential relays.

As part of the protection scheme for AC power distribution systems, it is desirable to detect faults occurring within the transformers used in the system. Upon detection of a fault within the transformer, circuit breakers are operated to disconnect the input and/or the output of the transformer thereby protecting the transformer as well as those portions of the power distribution system connected to the transformer.

Transformer differential relays have been used in the past to detect faults within a transformer. Such relays operate upon the theory that, in an unfaulted transformer, the current $I_p$ in the input windings is equal to the current $I_s$ in the output windings multiplied by the output to input winding turns ratio $R_t$; that is, $I_p = R_t I_s$. Upon occurrence of an internal fault, the quantities $I_p$ and $R_t I_s$ are no longer equal. Accordingly, a transformer differential relay continuously compares the magnitude of the quantities $I_p$ and $R_t I_s$ and will generate a trip signal when the difference between the quantities $I_p$ and $R_t I_s$ exceeds a predetermined maximum. The trip signal is used to operate one or more circuit breakers in order to disconnect the input and/or the output of the faulted transformer from the power distribution system.

Although transformer differential relays work well to detect the occurrence of internal faults, they have been known to erroneously generate a trip signal as a result of transformer inrush current. Transformer inrush current occurs as a result of the application of voltage to the input windings. Voltage is applied to the transformer input windings when, for example, the system is initially powered or following the clearance of a fault in the system. The presence of inrush current causes a difference to occur in the quantities $I_p$ and $R_t I_s$. When the difference exceeds the predetermined maximum, occasionally the relay will generate a trip signal even though the difference was caused by inrush current and not by an internal fault. As a result, the reliability of the relay and consequently the reliability of the entire AC power distribution system incorporating such a relay is diminished.

Therefore, it is an object of the present invention to provide a method and apparatus for enhancing the reliability of transformer differential relays.

It is another object of the present invention to provide a method and apparatus which enable transformer differential relays to provide better discrimination between transformer current differentials due to transformer inrush current and current differentials due to the occurrence of a fault.

It is yet another object of the present invention to provide a method and apparatus which enable transformer differential relays to prevent the occurrence of a trip signal based solely on inrush current having a magnitude less than a predetermined value.

It is still another object of the present invention to provide a method and apparatus for generating additional trip signal restraint in a transformer differential relay upon occurrence of an external fault.

It is a further object of the present invention to provide a method and apparatus for increasing the reliability of the transformer differential relay in the presence of current transformer saturation on either internal or external faults.

It is yet a further object of the present invention to provide a method and apparatus for generating an additional trip signal operate quantity in a transformer differential relay when transformer differential current exceeds a predetermined maximum value.

These and other objects of the present invention will become apparent to those skilled in the art upon consideration of the following invention.

SUMMARY OF THE INVENTION

The present invention comprises a transformer differential relay which includes means for inhibiting generation of a circuit breaker trip signal based solely upon transformer inrush current having a magnitude which is less than a predetermined maximum value. The trip signal inhibiting means comprises means for generating a vector sum of signals related to currents in the input and output windings of the transformer; means for measuring the magnitude of the positive portions of the vector sum and the negative portions of the vector sum; means for producing a restraint signal that is proportional to the absolute value of each of the input and output signals related to the currents in the input and output windings of the transformer; and means for providing a trip signal when the magnitude of the positive portions of the vector sum exceed a first predetermined maximum value plus the value of the restraint signal and the magnitude of the negative portions of the vector sum exceed a second predetermined maximum value, plus the value of the restraint signal.

In the preferred embodiment, the vector sum of quantities relating to currents flowing in the windings of the transformer is generated as an operate signal. This vector sum operate signal is applied to the input of a positive half wave rectifier and the input of a negative half wave rectifier. The output of the positive half wave rectifier is applied to an operate input of a summing and integrating amplifier. The output of the negative half wave rectifier is applied to the input of an inverter, the output of which is applied to an operate input of a second summing and integrating amplifier. The output of the first and second summing and integrating amplifiers are applied to the inputs of a first and second level detector respectively. The first and second level detectors each generate an output signal when the magnitude of the net input signal applied thereto exceeds a predetermined value.

The outputs of the first and second level detectors are applied to the inputs of a two input and gate. Upon coincidence of signals on the inputs of the and gate, an output trip signal is generated. Consequently, a trip signal is generated when the output of the first summing and integrating amplifier, which is related to the magnitude of the positive half wave rectified vector sum operate signal less the restraint signal, exceeds the predetermined threshold of the first level detector; and the output of the second summing and integrating amplifier, which is related to the magnitude of the negative half wave rectified vector sum operate signal less the restraint signal, exceeds the threshold of the second level detector.

DETAILED DESCRIPTION OF THE DRAWINGS

While the specification includes claims particularly pointing out and distinctly claiming that which is regarded as the present invention, the objects and advantages of this invention can be more readily ascertained from the following description of a preferred embodiment when read in conjunction with the accompanying drawings in which:

DETAILED DESCRIPTION OF THE PREFERRED EMBODIMENT

Figure 1:
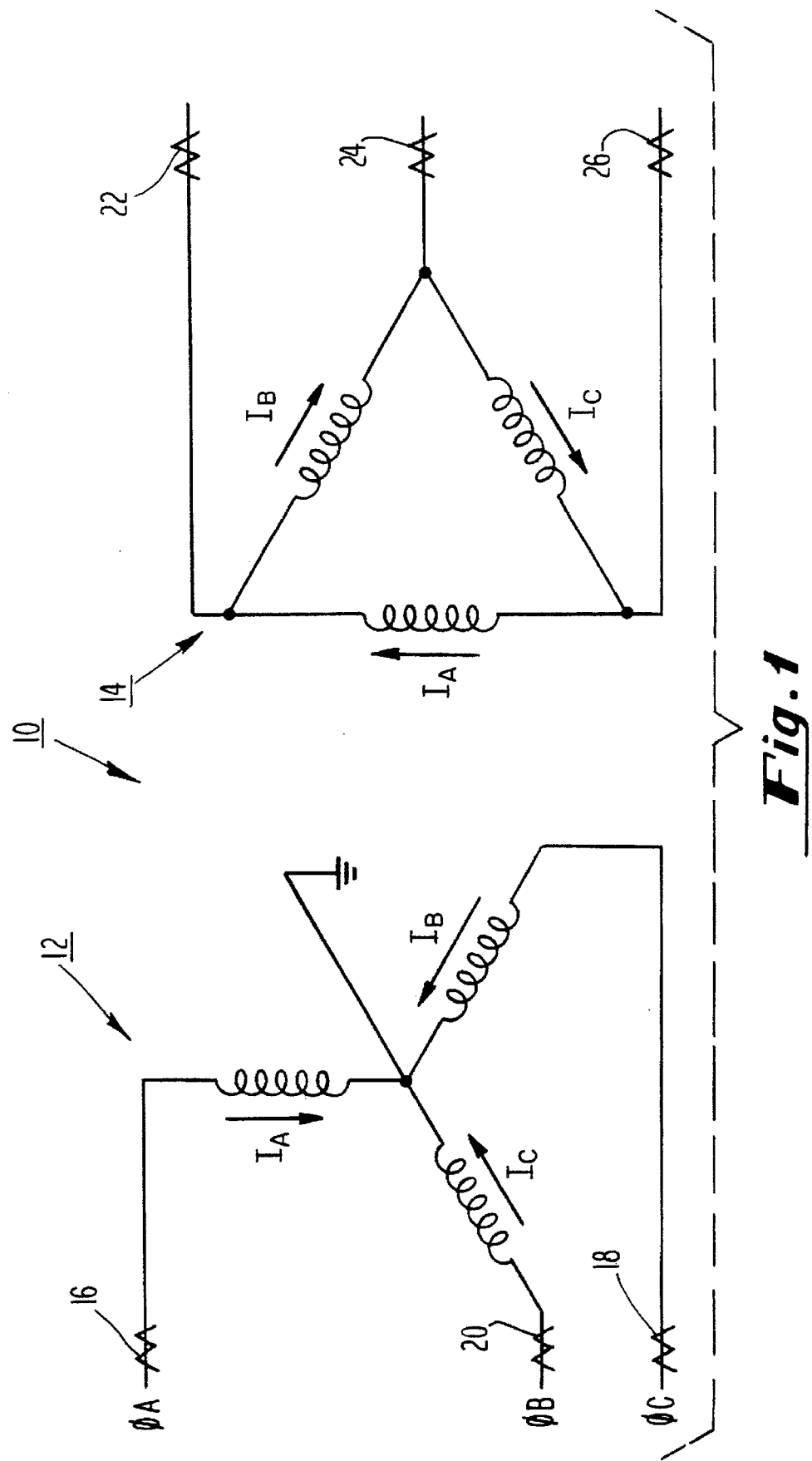
FIG. 1 is a schematic diagram of a step down transformer having a star connected side and a delta connected side.

The preferred embodiment of the transformer differential relay of the present invention is preferably used to protect transformers which are utilized in three phase alternating current electrical power distribution systems. The three phases are typically referred to as phase A, phase B and phase C. The type of transformers typically protected by transformer differential relays include three phase step up and step down power transformers. Such power transformers typically have a star connected winding and a delta connected winding but may have two star connected windings, a tapped star connected winding and a delta connected winding (autotransformer), two delta connected windings, or other combinations of star and delta connected windings. FIG. 1 schematically depicts an exemplary step down transformer, generally designated 10, which transforms a higher voltage applied to its input windings, generally designated 12, to a lower voltage produced at its output windings, generally designated 14. It should be noted that the transformer depicted in FIG. 1 is merely exemplary for purposes of this detailed description. Other types of transformers known by those skilled in the art to be usable in electrical power distribution systems are also protectable by the transformer differential relay of the present invention.

As shown in FIG. 1, the input windings 12 are connected in a star configuration and the output windings 14 are connected in a delta configuration as is known to those skilled in the art. The input windings 12 are connected to phases A, B and C of, for example, a high voltage transmission line; and the output windings 14 are connected to phases A, B and C of, for example, a low voltage distribution line. Current transformers 16, 18 and 20 are coupled to the phase A, B and C input windings respectively; and each produces an output which is representative of current flowing in the phase to which it is coupled. On the output side, a current transformer 22 is coupled to the phase A and phase B output windings; and produces an output signal which is representative of the vector sum of the current $-I_A$ flowing in the A phase output winding minus the current $-I_B$ flowing in the B phase output winding. Similarly, current transformer 24 produces an output signal which is representative of the vector sum of the current $-I_B$ minus the current $-I_C$ flowing in the C phase output winding; and current transformer 26 produces and output signal which is representative of the vector sum of the current $-I_C$ minus the current $-I_A$. The use of such current transformers to produce the signals indicated is well known to those of ordinary skill in the art.

As previously mentioned, transformer differential relays operate on the principle that, in an unfaulted transformer, the input current $I_p$ is equal to the output current $I_s$ multiplied by the output to input turns ratio $R_r$. In a three phase system, the difference between the $I_p$ and $R_r I_s$ quantities is usually measure for each phase current. For protected transformers having delta connected windings, the individual phase currents $I_A$, $I_B$ and $I_C$ are beneficially resolvable into three vector sum currents $-I_A + I_B$, $-I_B + I_C$ and $-I_C + I_A$ since such are relatively easy to monitor using three current transformers coupled to the delta windings as depicted in FIG. 1 and described above.

Since it is necessary to monitor corresponding currents on both the input and output sides of the protected transformer in order that the difference between the $I_p$ and $R_r I_s$ quantities have the proper significance in determining transformer faults, the individual phase currents monitored by the current transformers on the star connected side of the transformer will also be resolved into vector sum currents $I_A - I_B$, $I_B - I_C$ and $I_C - I_A$ as will be subsequently described. In this regard, it should be noted that the following detailed description is set forth with reference to one ($I_A - I_B$) of the three vector sum currents. Accordingly, the preferred embodiment described herein is one of three units, the other two units being associated with the $I_B - I_C$ and $I_C - I_A$ vector sum currents in this example.

Figure 6:
FIG. 6 is a depiction of an exemplary waveform characteristic of transformer inrush current.

It has been found that transformer inrush current is characterized by a substantially unipolar waveform which is essentially a portion of a sinusoid. See, for example, the wave-form depicted in FIG. 6. This is to be contrasted with a fault current which generally has a bipolar sinusoidal waveform. The transformer differential relay of the present invention operates on the principle that a circuit breaker trip output signal will be generated upon sensing a current having a bipolar waveform, the magnitude of which exceeds a first predetermined maximum value; and inhibiting the generation of a circuit breaker trip signal when the transformer current is substantially unipolar with a magnitude less than a second predetermined maximum value.

Figure 2:
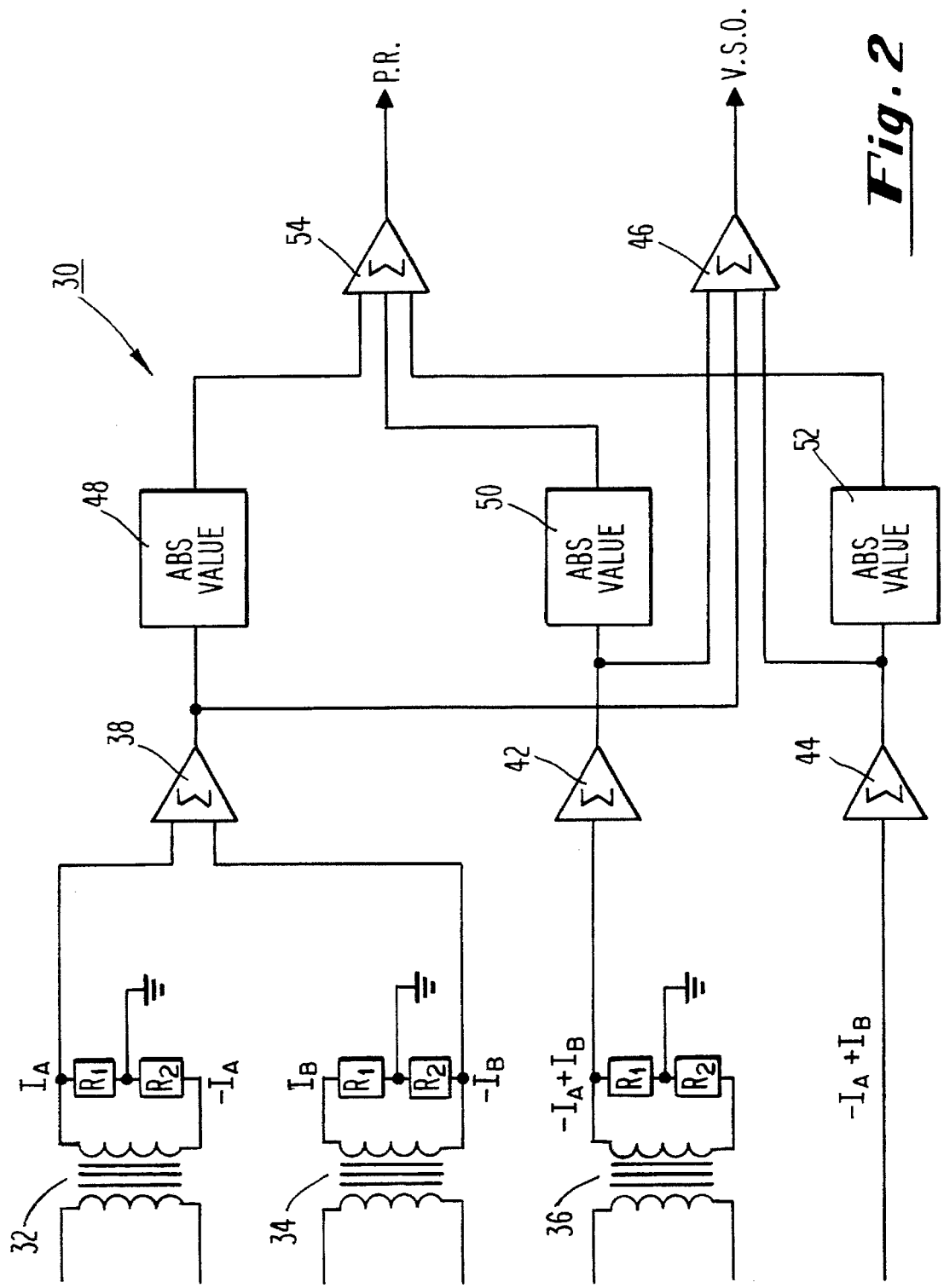
FIG. 2 is a schematic block diagram of a preferred embodiment of an input portion of a transformer differential relay in accordance with the present invention.

Referring now to FIG. 2, there is shown a schematic block diagram of the preferred embodiment of an input portion of a transformer differential relay in accordance with the present invention. The input portion, generally designated 30, comprises a first current transformer 32; a second current transformer 34; and a third current transformer 36. In the preferred embodiment described herein, these current transformers provide isolation and internal phase shift. The most economical method of providing the ratio balancing taps should be determined in accordance with the standard relay design practices as is known in the art. Each current transformer has an input winding and an output winding. A first resistor $R_1$, is connected between a first terminal of the output winding of each current transformer and reference; and a second resistor $R_2$ is connected between a second terminal of the output winding and reference such that the signal present at the second terminal has an inverted polarity with respect to the signal present at the first terminal.

The input winding of the first current transformer 32 is connected to a current transformer (not shown) coupled to the phase A winding of the star connected side of the transformer protected by the transformer differential relay. Accordingly, the signal present at the first terminal of the output winding of the first current transformer 32 is related to the current $I_A$ flowing in the phase A winding of the star connected side of the protected transformer; and the signal present at the second terminal is a signal $-I_A$ having an inverted polarity with respect to the signal $I_A$. The input winding of the second current transformer 34 is connected to a current transformer (not shown) coupled to the phase B winding of the star connected side of the transformer. Consequently, the signal present at the first terminal of the output winding of the second current transformer 34 is related to the current $I_B$ flowing in the phase B winding of the star connected side of the protected transformer; and the signal present at the second terminal is related to $-I_B$.

The signal $I_A$ from the first current transformer 32 is coupled to one input of a first summing amplifier 38. The signal $-I_B$ from the second current transformer 34 is coupled to a second input of the first summing amplifier 38. Although the embodiment described employs resistors connected between the terminals of the output windings and reference to obtain signals of inverted polarity, a second winding on the current transformer (or a tapped winding) could be beneficially employed instead. Alternatively, an invertor might be used to obtain a signal of inverted polarity although such might have a possible detrimental effect of clipping on high currents.

The input winding of the third current transformer 36 is connected to a current transformer (not shown) which is coupled to the phase A and phase B windings of the delta connected side of the protected transformer. The output of the current transformer coupled to the phase A and phase B delta windings is a signal related to the phase A current $I_A$ flowing in the phase A delta winding minus the phase B current $I_B$ flowing in the phase B delta winding. Accordingly, the output of the third current transformer 36 is related to the $-I_A + I_B$ current flowing in the delta connected side of the associated transformer. The output of the third current transformer 36 is coupled to the input of a second summing amplifier 42. The connection to the primary current transformer (not shown) is such that on external fault currents, or on load currents, the output of the summing amplifier 38 will be equal (or almost equal) and approximately 180° out of phase with the output of summing amplifier 42.

In those cases where the protected transformer includes more than two windings, or in those cases where there is more than one current transformer associated with each winding of the protected transformer, it is preferred that additional signals relating to the $-I_A + I_B$ current be generated and coupled to the input of additional summing amplifiers, a representative one being shown as summing amplifier 44 in FIG. 2.

The output of the summing amplifiers 38, 42 and 44 are coupled to the inputs of a fourth summing amplifier 46. The output of the fourth summing amplifier 46 is a signal related to the vector sum of the inputs and is utilized as a vector sum operate (VSO) signal as will be subsequently described. The outputs of the summing amplifiers 38, 42 and 44 are also coupled to the inputs of absolute value circuits 48, 50 and 52 respectively. Each of the absolute value circuits 48, 50 and 52 comprise a full wave rectifier. Accordingly, the output of each absolute value circuit is a signal related to the full wave rectified input signal. The outputs of the absolute value circuits 48, 50 and 52 are coupled to the inputs of a fifth summing amplifier 54.

The gain of the fifth summing amplifier 54 is selected to have a magnitude of less than one such that the output signal has a magnitude which is less than, or as will hereinafter be referred to as a percentage of the total sum of the full wave rectified outputs of the summing amplifiers 38, 42 and 44. The output signal is utilized as a percentage restraint (PR) signal as will be subsequently described. In the preferred embodiment, the magnitude of the PR signal is, for example, 25% of the total sum of the full wave rectified outputs of the summing amplifiers 38, 42 and 44. However, it should be noted that the percentage could be less than or greater than 25% and could be adjustable, for example over a range of from 15% to 40%. In addition, since the present invention utilizes half-wave summing and integrating amplifiers as will be subsequently described, the weighting of the percentage restraint will be a little more than one-half the weighting that would be used on full wave summing and integrating amplifiers.

Figure 3:
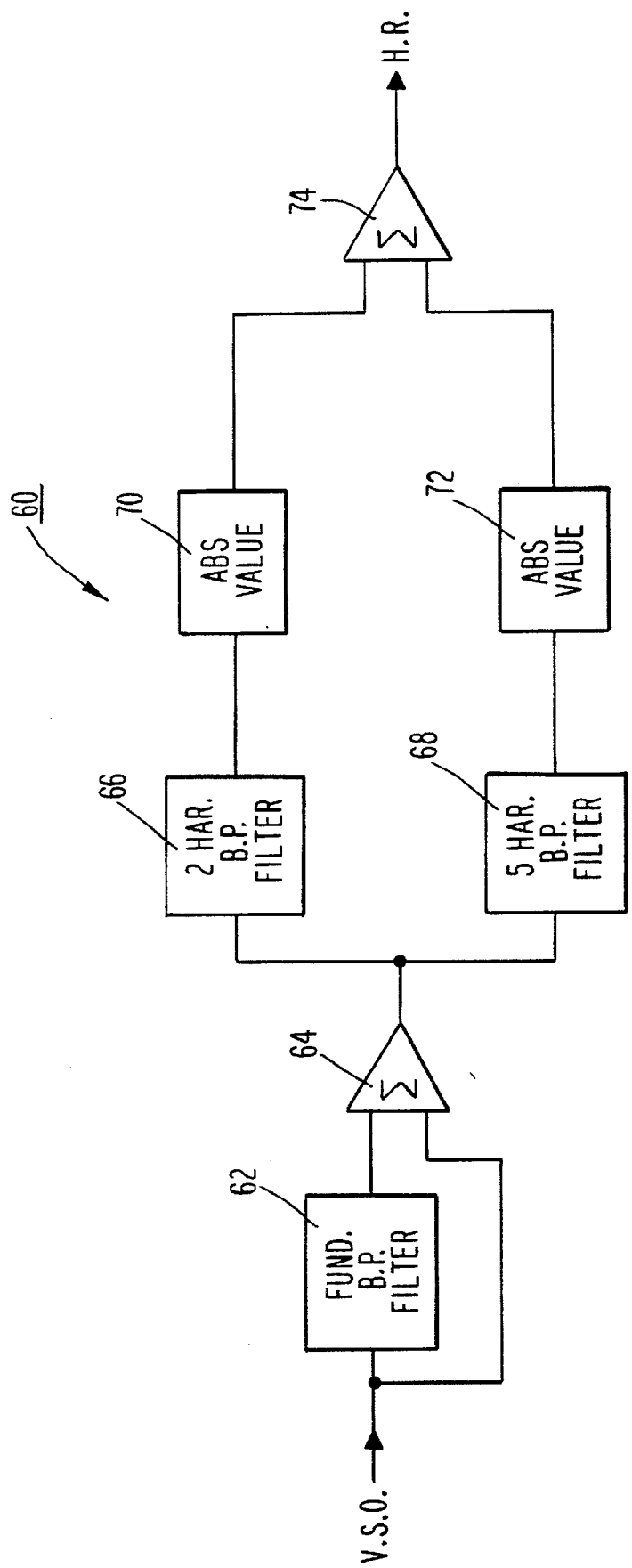
FIG. 3 is a schematic block diagram of a preferred embodiment of a harmonic restraint portion of the transformer differential relay in accordance with the present invention.

Referring now to FIG. 3, there is shown a schematic block diagram of a preferred embodiment of a harmonic restraint portion of the transformer differential relay. The harmonic restraint portion, generally designated 60, comprises a first band pass filter 62 having a Q on the order 1 to 2, a gain of minus 1 and a band pass center frequency tuned to the fundamental power frequency, typically 60 Hz or 50 Hz. The vector sum operate (VSO) signal from the fourth summing amplifier 46 of the input portion 30 (previously described with respect to FIG. 2) is coupled to the input of the first band pass filter 62 and one input of a sixth summing amplifier 64. The output of the first band pass filter 62, which is the inverted fundamental frequency of the VSO signal, is coupled to the other input of the sixth summing amplifier 64. The sixth summing amplifier 64 sums the algebraic values of the input signals; consequently, the output of the sixth summing amplifier 64 is the VSO signal with the fundamental frequency removed. Accordingly, the output signal from the sixth summing amplifier 64 includes the second and higher order harmonics of the VSO signal.

The output of the sixth summing amplifier 64 is coupled to the input of a second band pass filter 66 and the input of a third band pass filter, 68. The second band pass filter 66 has a Q approximately equal to 2; and a band pass center frequency tuned to the second harmonic of the VSO signal. Consequently, the output signal of the second band pass filter 66 is substantially equal to the second harmonic of the VSO signal. This output is coupled to the input of a fourth absolute value circuit 70. The third band pass filter 68 has a Q approximately equal to 2 and a band pass center frequency tuned to the fifth harmonic of the VSO signal. Consequently, the output signal of the third band pass filter 68 is substantially equal to the fifth harmonic of VSO signal. This output is coupled to the input of a fifth absolute value circuit 72.

The fourth 70 and fifth 72 absolute value circuits are essentially full wave rectifiers whose output is substantially equal to the full wave rectified input. The output of the fourth absolute value circuit 70 is coupled to one input of a seventh summing amplifier 74 and the output of the fifth absolute value circuit 72 is coupled to the other input of the seventh summing amplifier 74. The output of the seventh summing amplifier 74 is a signal which comprises the algebraic sum of the input signals. Consequently, the output of the seventh summing amplifier 74 comprises the algebraic sum of the full wave rectified values of the second and fifth harmonic components of the VSO signal. The output of the seventh summing amplifier 74 will be hereinafter referred to as the harmonic restraint (HR) signal.

Figure 4:
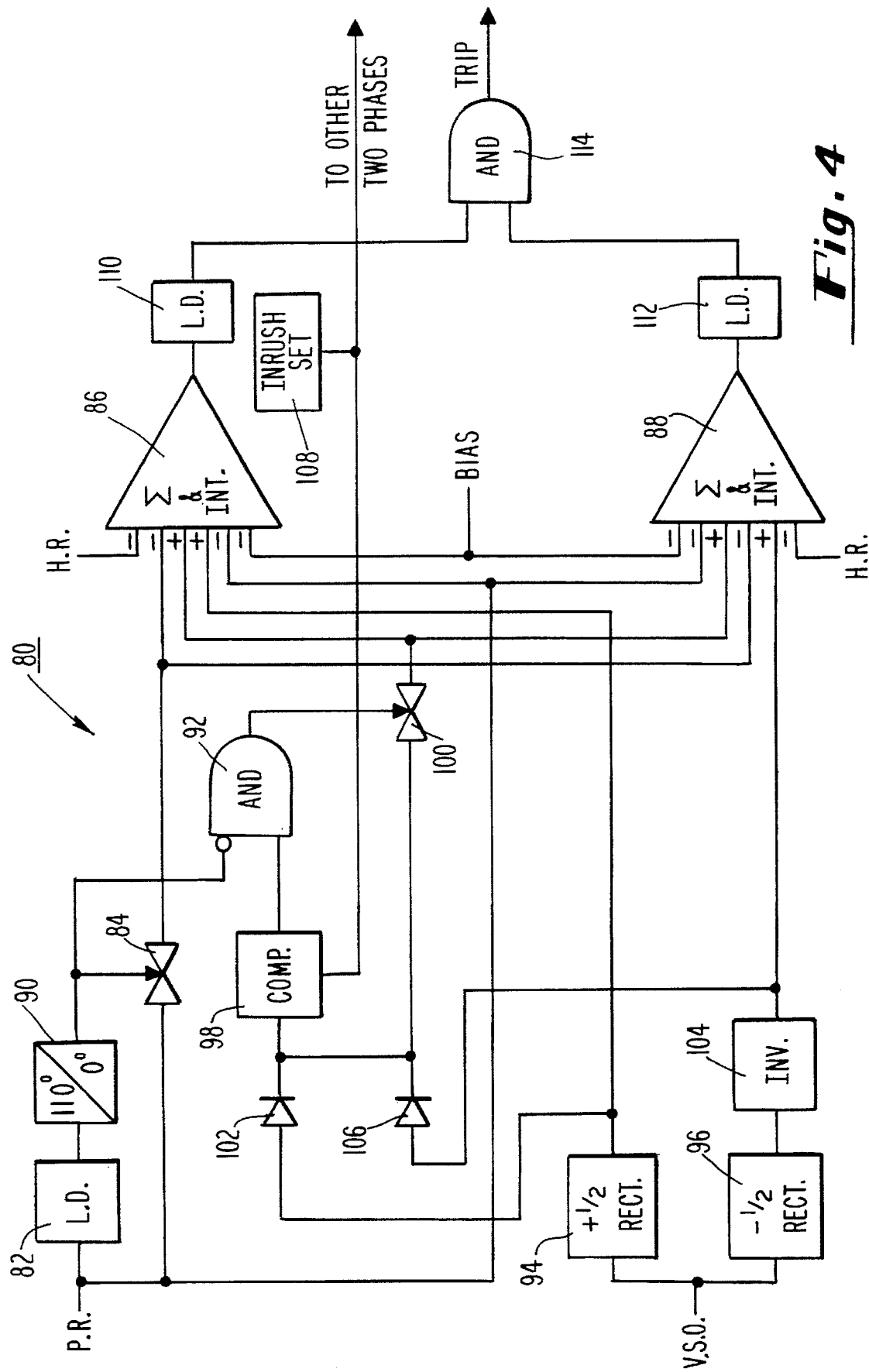
FIG. 4 is a schematic block diagram of a preferred embodiment of the remaining portion of the transformer differential relay in accordance with the present invention.
Figure 5:
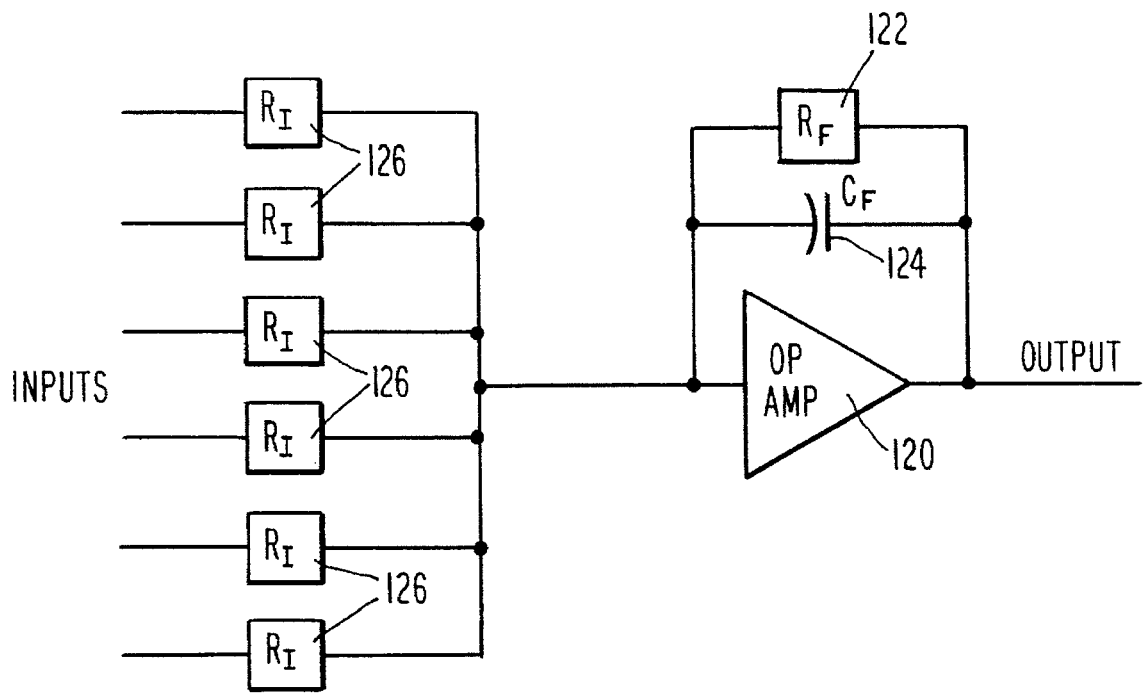
FIG. 5 is a schematic block diagram of a preferred embodiment of a summing and integrating amplifier.

Referring now to FIG. 4, there is shown a schematic block diagram of a preferred embodiment of the remaining portion of the transformer differential relay. The remaining portion, generally designated 80, comprises a first level detector 82, a first analog switch 84, a first summing and integrating amplifier 86 and a second summing and integrating amplifier 88. The first 86 and second 88 summing and integrating amplifiers each preferably comprises an operational amplifier 120 having a feed-back circuit connected between its output and input as shown in FIG. 5. The feedback circuit comprises a resistor 122 and a capacitor 124 connected in parallel. Each of the inputs to the summing and integrating amplifier is connected to one side of a resistor 126. The other side of each resistor 126 is connected to the input of the operational amplifier 120 as depicted in FIG. 5. The values of the resistor 122 and capacitor 124 are selected such that the summing and integrating amplifiers have a fairly long time constant in order that the restraint built up in one half cycle does not decay substantially to the next half cycle. A time constant of approximately 1.5 cycles is preferred. The output of the operational amplifier 120 is the output of the summing and integrating amplifier.

The summing and integrating amplifiers 86 and 88 are utilized in the preferred embodiment of the present invention in order to produce signals which are related to operate energy when the magnitude of the sum of the operate signals applied to the operate inputs of the summing and integrating amplifier exceeds the magnitude of the sum of the restraint signals applied to the restraint inputs; and to produce signals which are related to restraint energy when the magnitude of the sum of the restraint signals applied to the restraint inputs exceeds the magnitude of the sum of the operate signals applied to the operate inputs. Although operate and restraint signals could be summed to produce a net operate or restraint output signal, and such is considered within the scope and contemplation of the present invention, it is preferred to utilized operate and restraint energy, which is the integration of the net operate or restraint output signal over time, in order to eliminate erroneous, instantaneous responses.

The percentage restraint (PR) signal from the fifth summing amplifier 54 of the input portion 30 (previously described with respect to FIG. 2) is coupled to the input of the first level detector 82, the first analog switch 84, a negative (or restraint) input of the first summing and integrating amplifier 86 and a negative (or restraint) input of the second summing and integrating amplifier 88. In this detailed description, the terminology of a negative input implies a restraint signal into the summing and integrating amplifier and a positive input implies an operate signal. The magnitude of the sum of the restraint signals applied to the negative inputs must be exceeded by the magnitude of the sum of the operate signals applied to the positive inputs of the summing and integrating amplifier in order to generate a signal corresponding to net operate energy output from the summing and integrating amplifier.

The first level detector 82 produces an output signal when the input signal exceeds a predetermined maximum value. The output of the first level detector 82 is coupled to the input of a time delay circuit 90. The time delay circuit 90 produces an output after the input signal has been applied for a predetermined minimum period of time. In the preferred embodiment, this predetermined period of time is approximately 110 degrees of the 360 degree period of the fundamental frequency; or, in the case of a 60 Hz fundamental, the time delay circuit 90 will produce an output after the input has remained applied for approximately 5.3 msec. The output of the time delay circuit 90 is applied to the switch control input of the analog switch 84. Analog switch 84 couples the signal present at its input to its output upon receipt of a signal at its switch control input. The output of analog switch 84 is coupled to a restraint input of the first summing and integrating amplifier 86 and a restraint input of the second summing and integrating amplifier 88.

The output of the time delay circuit 90 is also coupled to an inverted input of a first AND gate 92. The vector sum operate (VSO) signal from the fourth summing amplifier 48 of the input portion 30 (previously described with respect to FIG. 2) is coupled to the input of a first half wave rectifier 94 and a second half wave rectifier 96. The output of the first half wave rectifier 94 is the positive portion of the half wave rectified input VSO signal. The output of the second half wave rectifier 96 is the negative portions of the half wave rectified input VSO signal. The positive half cycles of the VSO signal are used as an operate quantity of the first summing and integrating amplifier 86; and the negative half cycles of the VSO signal are used as an operate quantity of the second summing and integrating amplifier 88 as will subsequently be described. The output of the half wave rectifier 94 is coupled to the input of a comparator 98 and a second analog switch 100 through a first diode 102. The output of the first half wave rectifier 94 is also coupled to an operate input of the first summing and integrating amplifier 86.

The output of the second half wave rectifier 96 is coupled to the input of an inverter 104. The output of the inverter 104, which is the inverse of the negative portions of the half wave rectified VSO signal coupled to the input, is coupled to the input of the comparator 98 and the second analog switch 100 through a second diode 106. The output of the inverter 104 is also coupled to an operate input of the second summing and integrating amplifier 88. A signal from an inrush set circuit 108, which is representative of the maximum magnitude of transformer inrush current expected for the protected transformer, is coupled to the comparator input of the comparator 98. The inrush set signal is also coupled to the other two phase units. The output of the comparator 98, which occurs when the input exceeds the signal level applied at the comparator input, is coupled to the second input of the AND gate 92.

The output of the AND gate 92, which is produced when there is a coincidence of a signal output from the comparator 98 and no signal output from the time delay circuit 90, is coupled to the control signal input of the second analog switch 100. The second analog switch 100 switches the signal at its input to its output upon receipt of a signal at its control input. The output of the second analog switch 100 is coupled to an operate input of the first summing and integrating amplifier 86 and an operate input of the second summing and integrating amplifier 88.

A bias voltage is coupled to a restraint input of the first summing and integrating amplifier 86 and a restraint input of the second summing and integrating amplifier 88. The magnitude of the bias voltage is selected to establish a minimum sensitivity and to establish a restraint level in the summing and integration stage in the quiescent state. The harmonic restraint (HR) signal is coupled to a restraint input of the first summing and integrating amplifier 86 and a restraint input of the second summing and integrating amplifier 88. Although use of harmonic restraint in the context of the present invention may not be necessary, it is expected that CT saturation or transformer inrush might require it. Consequently inclusion of harmonic restraint is preferred. The weighting of harmonic restraint will preferably be established by test and may require field selection.

The output of the first summing and integrating amplifier 86, which is a signal having a magnitude equal to the integrated algebraic sum of the magnitudes of the input signals, is coupled to the input of a second level detector 110. The output of the second summing and integrating amplifier 88, which is a signal having a magnitude which is substantially equal to the integrated, algebraic sum of the magnitudes of the input signals, is coupled to the input of a third level detector 112. The second 110 and third 112 level detectors each produce an output when the input signal exceeds a predetermined value. The output of the second level detector 110 is coupled to one input of a second AND gate 114. The output of the third level detector 112 is coupled to the other input of the second AND gate 114.

The output of the AND gate 114, which is produced upon coincidence of a signal from the second level detector 110 and the third level detector 112, is hereinafter referred to as a circuit breaker trip signal and is coupled to the circuit breakers which are associated with the protected transformer. The second 110 and third 112 level detectors each preferably include a reset timer with an estimated setting of approximately one cycle so as to provide an overlap between the outputs when the inputs occur during alternate half cycles; resulting in a nominal one cycle operating time.

The transformer differential relay of the present invention operates as follows. On external fault currents, or heavy load currents, the transformer differential relay should not operate. As previously stated, the connections to the relay are such that, for example, on a two winding transformer, the output of summing amplifiers 38 and 42 (see FIG. 2) will be approximately equal and 180 degrees out of phase. Thus, there will be a percentage restraint signal into the summing and integrating amplifiers 86 and 88 (see FIG. 4); however, there will be essentially no operate signal since the VSO signal will be essentially zero.

Assuming that there is a fault current in the protected transformer, the VSO signal will be a bipolar sinusoid as previously described. Consequently, there will be a positive output signal from the first half wave rectifier 94 and a positive output signal from the inverter 104 which signals are applied to positive inputs of the first 86 and second 88 summing and integrating amplifiers respectively. Accordingly, there will be an output signal from both the first 86 and second 88 summing and integrating amplifiers if the magnitude of the signals applied to the positive inputs (operate signals) of the summing and integrating amplifiers exceeds the magnitude of the signals applied to the negative inputs (restraint signals). Assuming that the magnitude of the output signals from the first 86 and second 88 summing and integrating amplifiers exceeds the levels set in the third 110 and fourth 112 level detectors, the second AND gate 114 will produce a circuit breaker trip signal. Thus, it can be seen that the transformer differential relay of the present invention will produce a circuit breaker trip signal upon detection of an internal fault current.

As previously stated, the transformer inrush current is characterized by a signal having a waveform which is substantially a portion of a sinusoid having a single polarity. Assuming the presence of a transformer inrush current, the VSO signal, which is representative of the vector sum of the currents $I_A - I_B$ in the transformer windings, will be in the form of a unipolar signal of a portion of a sinusoid. Similarly, PR signal, which is related to the vector sum of the absolute values of the $I_A - I_B$ currents in the transformer windings, will also be in the form of a unipolar signal of a portion of a sinusoid. Assuming that the half wave rectified VSO signal is unipolar in the positive direction an output will appear from the first half wave rectifier 94 which is applied to a positive input of the first summing and integrating amplifier 86. However, no output will appear from the second half wave rectifier 96 and consequently no output will appear from the inverter 104 which is applied to the positive input of the second summing and integrating amplifier 88.

Assuming the magnitude of the inrush current did not exceed the maximum value set by the inrush current set circuit 108, there will be no output from the first AND gate 92. Consequently, there will be no output from the second analog switch 100 which is applied to the positive inputs of the first 86 and second 88 summing and integrating amplifiers. Since no positive input signals have been applied to the second summing and integrating amplifier 88, the output signal therefrom will not exceed the predetermined level set in the third level detector 112. Consequently, there will be no output from the third level detector 112 and therefore no trip signal generated from the second AND gate 114.

Assuming that the magnitude of the transformer internal fault current is substantially larger than the expected maximum value set by the inrush current set network 108, the comparator 98 will generate an output signal which is coupled to one input of the first AND gate 92. The magnitude of PR signal will exceed the level set in the first level detector 82. However, until the PR signal exceeds that level for more than 110 degrees, there will be no output from the time delay circuit 90. Accordingly, since there is no output initially from the time delay circuit 90 and there is a coincident output from the comparator 98, there will be an output from the first AND gate 92 which will cause the second analog switch 100 to couple the output signals from the first half wave rectifier 94 (or the inverter 104) to positive inputs of both the first 86 and second 88 summing and integrating amplifiers. Such will cause the outputs of the first 86 and second 88 summing and integrating amplifiers to exceed the levels set in the second 110 and third 112 level detectors respectively before time delay circuit 90 operates. Consequently, coincident outputs will appear at the inputs of the second AND gate 114 causing the second AND gate 114 to produce a trip signal. Thus, as can be seen from the above description, the transformer differential relay of the present invention will produce a very fast output as a result of very large fault currents in the protected transformer.

There is a possibility, albeit relatively remote, that there will be an inrush to all three windings of a transformer bank which will result in a dual polarity inrush current in one of the three relays. For this reason, the harmonic restraint utilized in prior art transformer differential relays, has been retained in the relay of the present invention. However, it is much lower in magnitude than in prior art relays because dual polarity inrush currents have a much higher percentage of harmonic currents. See for example the paper entitled "A Dissertation on Power Transformer Excitation and Inrush Characteristics", by J. Berdy et al, presented to the Western Systems Coordinating Council Relaying Committee, San Francisco, Calif., Mar. 17, 1976, which paper is incorporated by reference in this detailed description as if fully set forth herein.

In applications where one winding of the transformer is connected to more than one set of current transformers, there is a distinct possibility that one set of current transformers may saturate on an external fault due to a difference in residual flux level in the current transformers. The current transformer with a residual flux in the same direction as that produced by the first half cycle of fault current will most likely be the one to saturate. To insure that the transformer differential relay of the present invention does not produce a false trip output, a variable restraint circuit is provided by level detector 82, time delay circuit 90, and analog switch 84 (see FIG. 4). In the first part of the first half cycle of a fault current, before any current transformer saturates, a restraint signal will build up in the summing and integrating amplifiers 86 and 88 because the percentage restraint signal (PR) will be large while the VSO signal will be approximately zero. When one current transformer saturates, the PR signal will be reduced and the VSO signal may become substantially larger than the PR signal. However, before the summing and integrating amplifiers 86 and 88 can reverse their restraint energy, the time delay circuit 90 operates to remove the additional operate signal via analog switch 100 and increase the restraint signal via analog switch 84.

By contrast, on an internal fault the effect of current transformer saturation is to permit a large relaying current in the first part of the first half cycle of fault current; and, after the current transformer saturates, to substantially reduce both the PR and VSO signals. Thus, on very large internal fault currents, where current transformer saturation is probable, the relay can operate in the first part of the first half cycle of fault current, as previously described.

In view of the above, it can be seen that the present invention enhances the reliability of transformer differential relays by providing a method and apparatus for enabling the transformer differential relays to discriminate between transformer current differentials due to transformer inrush current and current differentials due to the occurrence of a fault.

While the present invention has been described with reference to a specific embodiment thereof, it will be obvious to those skilled in the art that various changes and modifications may be made without departing from the invention in its broader aspects. It is contemplated in the appended claims to cover all variations and modifications of the invention that come within the true spirit and scope of my invention.

I claim:

1. A transformer differential relay comprising:
    (a) means for generating a first signal representative of currents flowing in at least two windings of a transformer;
    (b) means for generating a second signal representative of a positive portion of said first signal and a third signal representative of a negative portion of said first signal;
    (c) means for generating a harmonic restraint signal;
    (d) means for generating a first output signal when the algebraic sum of the magnitude of said harmonic restraint signal and said second signal exceeds a first predetermined value, and a second output signal when the algebraic sum of the magnitude of said harmonic restraint signal and said third signal exceeds a second predetermined value; and
    (e) means for providing a trip signal upon coincidence of said first and second output signals.

2. A transformer differential relay in accordance with claim 1 wherein said means for generating said first signal comprises:
    (a) means for generating one signal representative of said currents flowing in said transformer;
    (b) means for generating at least another signal representative of said currents, each of said at least another signals substantially equal to and 180 degrees out of phase with respect to said one signal for external fault currents and load currents; and
    (c) means for generating a signal representative of the vector sum of said one signal and each of a said at least another signals.

3. A transformer differential relay in accordance with claim 2 wherein:
    (a) said means for generating a first output signal comprises a first summing and integrating amplifier having an output coupled to an input of a first level detector; and
    (b) said means for generating a second output signal comprises a second summing and integrating amplifier having an output which is coupled to a second level detector.

4. A transformer differential relay in accordance with claim 3 wherein said means for generating a trip signal comprises an AND gate having a first input coupled to an output of said first level detector, a second input coupled to an output of said second level detector, and an output for generating said trip signal upon coincidence at signals received at said first and second inputs.

5. A transformer differential relay in accordance with claim 4 wherein said first summing and integrating amplifier and said second summing and integrating amplifier each comprise an operational amplifier having a parallel resistive/capacitive circuit coupled between an output and an input of said operational amplifier.

6. A transformer differential relay in accordance with claim 5 wherein said means for generating said second signal comprises a first half-wave rectifier and said means for generating said third signal comprises a second half-wave rectifier.

7. A transformer differential relay in accordance with claim 1 wherein said harmonic restraint signal is a signal representative of the absolute value of the second harmonic of said first signal.

8. A transformer differential relay in accordance with claim 1 wherein said harmonic restraint signal is a signal representative of the sum of the absolute value of the second harmonic of said first signal and the absolute value of the fifth harmonic of said first signal.

9. In a transformer differential relay of the type employing at least one operate signal and at least one restraint signal to generate a trip signal when the magnitude of the sum of said at least one operate signal exceeds the magnitude of the sum of said at least one restraint signal by a predetermined amount, means for enhancing reliability of operation of said relay in the presence of current transformer saturation, said means comprising:
    (a) means for generating a vector sum operate signal representative of the vector sum of currents flowing in at least two windings of a transformer;
    (b) means for generating a signal representative of the absolute value of said vector sum operate signal; and
    (c) means for generating an additional operate signal when the magnitude of the absolute value of said vector sum operate signal exceeds a first predetermined magnitude.

10. A transformer differential relay in accordance with claim 9 additionally comprising:
    (a) means for generating a percentage restraint signal representative of the absolute values of currents flowing in at least two windings of a transformer; and
    (b) means for terminating said additional operate signal and generating an additional restraint signal when the magnitude of the percentage restraint signal exceeds a second predetermined magnitude for a predetermined period of time.

11. A transformer differential relay in accordance with claim 10 wherein said means for generating said signal representative of the absolute value of said vector sum operate signal comprises:
    (a) means for generating a first signal representative of a positive portion of said vector sum operate signal;
    (b) means for generating a second signal representative of a negative portion of said vector sum operate signal;

(c) means for inverting the polarity of said second signal; and (d) means for combining said first signal and said inverted second signal to form the absolute value of said vector sum operate signal.

12. A transformer differential relay in accordance with claim 11 wherein said means for generating said vector sum operate signal comprises:

(a) means for generating one signal representative of said currents flowing in said transformer;

(b) means for generating at least another signal representative of said currents, each of said at least another signals substantially equal to and 180 degrees out of phase with respect to said one signal for external fault currents and load currents; and (c) means for generating a signal representative of the vector sum of said one signal and each of said at least another signals.

13. A transformer differential relay in accordance with claim 12 wherein said means for generating said percentage restraint signal comprises:

(a) means for generating the absolute value of said one signal;

(b) means for generating the absolute value of each of said at least another signals; and (c) means for generating a signal which is substantially equal to a percentage of the sum of the absolute values of said one signal and each of said at least another signals.

14. A transformer differential relay in accordance with claim 13 wherein said means for generating an additional operate signal comprises:

(a) first level detector means for generating an output signal when the magnitude of the absolute value of said vector sum operate signal exceeds said first predetermined magnitude; and (b) first switch means, responsive to the output signal from said first level detector means, for switching the absolute value of said vector sum operate signal to an output thereof upon receipt of said output signal from said first level detector means.

15. A transformer differential relay in accordance with claim 14 wherein said means for terminating said additional operate signal and generating an additional restraint signal comprises:

(a) second level detector means for generating an output signal when the magnitude of said percentage restraint signal exceeds said second predetermined magnitude;

(b) time delay circuit means connected to receive the output from said second level detector means, said time delay circuit means generating an output signal whenever the duration of the output signal from said second level detector means exceeds said predetermined period of time;

(c) said first switch means, additionally responsive to the output from said time delay circuit means, for removing the absolute value of said vector sum operate signal from the output thereof upon receipt of said output signal from said time delay circuit means; and (d) second switch means, responsive to the output from said time delay circuit means, for switching said percentage restraint signal to an output thereof as said additional restraint signal upon receipt of said output signal from said time delay circuit means.

16. A transformer differential relay in accordance with claim 15 wherein said means for generating said first signal comprises a first half-wave rectifier and said means for generating said second signal comprises a second half-wave rectifier.

17. A transformer differential relay in accordance with claim 11 additionally comprising:

(a) means for generating a first output signal when the magnitude of a first signal representative of a positive portion of said vector sum operate signal exceeds a third predetermined magnitude;

(b) means for generating a second output signal when the magnitude of a second signal representative of a negative portion of said vector sum operate signal exceeds a fourth predetermined magnitude; and (c) means for producing a trip signal upon coincidence of said first and second output signals.

18. A transformer differential relay in accordance with claim 9 additionally comprising means for generating a harmonic restraint signal which is employed in generating said trip signal.

19. A transformer differential relay in accordance with claim 18 wherein said harmonic restraint signal is a signal representative of the absolute value of the second harmonic of said first signal.

20. A transformer differential relay in accordance with claim 18 wherein said harmonic restraint signal is a signal representative of the sum of the absolute value of the second harmonic of said first signal and the absolute value of the fifth harmonic of said first signal.

21. In a transformer differential relay of the type employing operate energy and restraint energy to generate a trip signal when the operate energy exceeds the restraint energy by a predetermined amount, means for enhancing reliability of operation in the presence of current transformer saturation, said means comprising:

(a) means for generating a vector sum operate signal representative of the vector sum of currents flowing in at least two windings of a transformer;

(b) means for generating a signal representative of the absolute value of said vector sum operate signal; and (c) means for generating additional operate energy when the magnitude of the absolute value of said vector sum operate signal exceeds a first predetermined magnitude.

22. A transformer differential relay in accordance with claim 21 additionally comprising:

(a) means for generating a percentage restraint signal representative of the absolute value of currents flowing in at least two windings of a transformer; and (b) means for terminating said additional operate energy and generating additional restraint energy when the magnitude of the percentage restraint signal exceeds a second predetermined magnitude for a predetermined period of time.

23. A transformer differential relay in accordance with claim 22 wherein said means for generating said signal representative of the absolute value of said vector sum operate signal comprises:

(a) means for generating a first signal representative of a positive portion of said vector sum operate signal;

(b) means for generating a second signal representative of a negative portion of said vector sum operate signal;

(c) means for inverting the polarity of said second signal; and (d) means for combining said first signal and said inverted second signal to form the absolute value of said vector sum operate signal.

24. A transformer differential relay in accordance with claim 23 wherein said means for generating said vector sum operate signal comprises:

(a) means for generating one signal representative of said currents flowing in said transformer;

(b) means for generating at least another signal representative of said currents, each of said at least another signals substantially equal to and 180 degrees out of phase with respect to said one signal for external fault currents and load currents; and (c) means for generating a signal representative of the vector sum of said one signal and each of said at least another signals.

25. A transformer differential relay in accordance with claim 24 wherein said means for generating said percentage restraint signal comprises:

(a) means for generating the absolute value of said one signal;

(b) means for generating the absolute value of each of said at least another signals; and (c) means for generating a signal which is substantially equal to a percentage of the sum of the absolute values of said one signal and each of said at least another signals.

26. A transformer differential relay in accordance with claim 25 wherein said means for generating additional operate energy comprises:

(a) first level detector means for generating an output signal when the magnitude of the absolute value of said vector sum operate signal exceeds said first predetermined magnitude; and (b) first switch means, responsive to the output signal from said first level detector means, for applying the absolute value of said vector sum operate signal to an operate input of at least one summing and integrating amplifier.

27. A transformer differential relay in accordance with claim 26 wherein said means for terminating said additional operate energy and generating additional restraint energy comprises:

(a) second level detector means for generating an output signal when the magnitude of said percentage restraint signal exceeds said second predetermined magnitude;

(b) time delay circuit means connected to receive the output from said second level detector means, said time delay circuit means generating an output signal whenever the duration of the output signal from said second level detector means exceeds said predetermined period of time;

(c) said first switch means, additionally responsive to the output of said time delay circuit means, for removing the absolute value of said vector sum operate signal from the operate input of said at least one summing and integrating amplifier upon receipt of said output signal from said time delay circuit means; and (d) second switch means, responsive to the output from said time delay circuit means, for applying said percentage restraint signal as said additional restraint signal to a restraint input of said at least one summing and integrating amplifier upon receipt of said output signal from said time delay circuit means.

28. A transformer differential relay in accordance with claim 27 wherein said percentage restraint signal is coupled to a restraint input of each of said first and second summing and integrating amplifiers.

29. A transformer differential relay in accordance with claim 28 wherein said means for generating said first signal comprises a first half-wave rectifier and said means for generating said second signal comprises a second half-wave rectifier.

30. A transformer differential relay in accordance with claim 21 additionally comprising means for generating a harmonic restraint signal coupled to a restraint input of each of said first and second summing and integrating amplifiers.

31. A transformer differential relay in accordance with claim 20 wherein said harmonic restraint signal is a signal representative of the absolute value of the second harmonic of said first signal.

32. A transformer differential relay in accordance with claim 30 wherein said harmonic restraint signal is a signal representative of the sum of the absolute value of the second harmonic of said first signal and the absolute value of the fifth harmonic of said first signal.

33. A transformer differential relay in accordance with claim 21 additionally comprising:

(a) means for generating a first output signal when the magnitude of a first signal representative of a positive portion of said vector sum operate signal exceeds a third predetermined magnitude;

(b) means for generating a second output signal when the magnitude of a second signal representative of a negative portion of said vector sum operate signal exceeds a fourth predetermined magnitude; and (c) means for producing a trip signal upon coincidence of said first and second output signals.

34. In a transformer differential relay of the type employing at least one operate signal and at least one restraint signal to generate a trip signal when the magnitude of the sum of said at least one operate signal exceeds the magnitude of the sum of said at least one restraint signal by a predetermined amount, a method for enhancing reliability of operation of said relay in the presence of current transformer saturation, said method comprising the steps of:

(a) generating a vector sum operate signal representative of the vector sum of currents flowing in at least two windings of a transformer;

(b) generating a signal representative of the absolute value of said vector sum operate signal; and (c) generating an additional operate signal when the magnitude of the absolute value of said vector sum operate signal exceeds a first predetermined magnitude.

35. The method in accordance with claim 34 additionally comprising the steps of:

(a) generating a percentage restraint signal representative of the absolute values of currents flowing in at least two windings of a transformer; and (b) terminating said additional operate signal and generating an additional restraint signal when the magnitude of the percentage restraint exceeds a second predetermined magnitude for a predetermined period of time.

36. The method in accordance with claim 35 wherein the step of generating said signal representative of the absolute value of said vector sum operate signal comprises the steps of:

(a) generating a first signal representative of a positive portion of said vector sum operate signal;

(b) generating a second signal representative of a negative portion of said vector sum operate signal;

(c) inverting the polarity of said second signal; and (d) combining said first signal and said inverted second signal to form the absolute value of said vector sum operate signal.

37. The method in accordance with claim 36 additionally comprising the steps of:
    (a) generating a first output signal when the magnitude of said first signal exceeds a third predetermined magnitude;
    (b) generating a second output signal when the magnitude of said second signal exceeds a fourth predetermined magnitude; and
    (c) producing a trip signal upon coincidence of said first and second output signals.

38. The method in accordance with claim 34 additionally comprising the steps of generating a harmonic restraint signal and employing said harmonic restraint signal in generating said trip signal.

39. In a transformer differential relay of the type employing operate energy and restraint energy to generate a trip signal when the operate energy exceeds the restraint energy by a predetermined amount, a method for enhancing reliability of operation in the presence of current transformer saturation, said method comprising the steps of:
    (a) generating a vector sum operate signal representative of the vector sum of the currents flowing in at least two windings of a transformer;
    (b) generating a signal representative of the absolute value of said vector sum operate signal; and
    (c) means for generating additional operate energy when the magnitude of the absolute value of said vector sum operate signal exceeds a first predetermined magnitude.

40. The method in accordance with claim 39 additionally comprising the steps of:
    (a) generating a percentage restraint signal representative of the absolute value of currents flowing in at least two windings of a transformer; and
    (b) terminating said additional operate energy and generating additional restraint energy when the magnitude of the percentage restraint signal exceeds a second predetermined magnitude for a predetermined period of time.

41. The method in accordance with claim 40 wherein the step of generating said signal representative of the absolute value of said vector sum operate signal comprises the steps of:
    (a) generating a first signal representative of a positive portion of said vector sum operate signal;
    (b) generating a second signal representative of a negative portion of said vector sum operate signal;
    (c) inverting the polarity of said second signal; and
    (d) combining said first signal and said inverted second signal to form the absolute value of said vector sum operate signal.

42. A transformer differential relay, susceptible to operation on inrush current and an internal fault current, said relay comprising:
    (a) means for generating a trip signal; and
    (b) means for generating a harmonic restraint signal coupled to first and second summing, integrating and comparing means for discriminating between said inrush current and said internal fault current, said trip signal generating means responsive to said discrimination to generate said trip signal.

43. The method in accordance with claim 38 additionally comprising the step of generating a harmonic restraint signal.

44. A method in accordance with claim 43 wherein said step of generating a harmonic restraint signal comprises generating a signal representative of the absolute value of the second harmonic of said first signal.

45. A method in accordance with claim 43 wherein said step of generating a harmonic restraint signal comprises generating a signal representative of the sum of the absolute value of the second harmonic of said first signal and the absolute value of the fifth harmonic of said first signal.

46. A method for enhancing reliability of operation of a transformer differential relay comprising the steps of:
    (a) generating a first signal representative of currents flowing in at least two windings of a transformer;
    (b) generating a second signal representative of a positive portion of said first signal and a third signal representative of a negative portion of said first signal;
    (c) generating a harmonic restraint signal;
    (d) generating a first output signal when the algebraic sum of the magnitude of said harmonic restraint signal and said second signal exceeds a first predetermined value, and a second output signal when the algebraic sum of the magnitude of said harmonic restraint signal and said third signal exceeds a second predetermined value; and
    (e) providing a trip signal upon coincidence of said first and second output signals.

47. The method in accordance with claim 39 additionally comprising the steps of:
    (a) generating a first output signal when the magnitude of a first signal representative of a positive portion of said vector sum operate signal exceeds a third predetermined magnitude;
    (b) generating a second output signal when the magnitude of a second signal representative of a negative portion of said vector sum operate signal exceeds a fourth predetermined magnitude; and
    (c) producing a trip signal upon coincidence of said first and second output signals.

48. The method in accordance with claim 46 wherein step (c) comprises generating a harmonic restraint signal which is representative of the absolute value of the second harmonic of said first signal.

49. The method in accordance with claim 46 wherein step (c) comprises generating a harmonic restraint signal which is representative of the sum of the absolute value of the second harmonic of said first signal and the absolute value of the fifth harmonic of said first signal.

50. A transformer differential relay comprising:
    (a) means for generating a first signal representative of currents flowing in at least two windings of a transformer;
    (b) means for generating a second signal representative of a positive portion of said first signal and a third signal representative of a negative portion of said first signal;
    (c) first summing and integrating means and first level detection means for generating a first output signal when the magnitude of said second signal exceeds a first predetermined value;
    (d) second summing and integrating means and second level detection means for generating a second output signal when the magnitude of said third signal exceeds a second predetermined value; and
    (e) means for providing a trip signal upon coincidence of said first and second output signals.

51. A transformer differential relay in accordance with claim 50 additionally comprising means for generating a harmonic restraint signal coupled to a restraint input of each of said first and second summing, integrating and level detection means.

52. A transformer differential relay in accordance with claim 51 wherein said harmonic restraint signal is a signal representative of the absolute value of the second harmonic of said first signal.

53. A transformer differential relay in accordance with claim 51 wherein said harmonic restraint signal is a signal representative of the sum of the absolute value of the second harmonic of said first signal and the absolute value of the fifth harmonic of said first signal.

54. A transformer differential relay in accordance with claim 50 wherein said means for generating said first signal comprises:
  (a) means for generating one signal representative of said currents flowing in said transformer;
  (b) means for generating at least another signal representative of said currents, each of said at least another signals substantially equal to and 180° out of phase with respect to said one signal for external fault currents and load currents; and
  (c) means for generating a signal representative of the vector sum of said one signal and each of said at least another signals.

55. A transformer differential relay in accordance with claim 54 wherein said means for generating a trip signal comprises and gate having a first input coupled to an output of said first level detection means, a second input coupled to an output of said second level detection means, and an output for generating said trip signal upon coincidence of signals received at said first and second inputs.

56. A transformer differential relay in accordance with claim 55 wherein said first summing and integrating means and said second summing and integrating means each comprises an operational amplifier having a parallel resistive/capacitive circuit coupled between an output and an input of said operational amplifier.

57. A transformer differential relay in accordance with claim 56 wherein said means for generating said second signal comprises a first half-wave rectifier and said means for generating said third signal comprises a second half-wave rectifier.

58. A method for enhancing reliability of operation of a transformer differential relay comprising the steps of:
  (a) generating a first signal representative of currents flowing at least two windings of a transformer;
  (b) generating a second signal representative of a positive portion of said first signal and a third signal representative of a negative portion of said first signal;
  (c) generating, from first summing and integrating means and first level detection means, a first output signal when the magnitude of said second signal exceeds a first predetermined value;
  (d) generating, from second summing and integrating means and first level detection means, a second output signal when the magnitude of said third signal exceeds a second predetermined value; and
  (e) providing a trip signal upon coincidence of said first and second output signals.

59. The method in accordance with step 58 additionally comprising the step of generating a harmonic restraint signal and wherein steps (c) and (d) comprise:
  (c) generating, using first summing and integrating means and first level detection means, a first output signal when the algebraic sum of the magnitude of said harmonic restraint signal and said second signal exceeds the first predetermined value; and
  (d) generating, using second summing and integrating means and second level detection means, a second output signal when the algebraic sum of the magnitude of said harmonic restraint signal and said third signal exceeds a second predetermined value.

60. A method in accordance with claim 59 wherein the step of generating a harmonic restraint signal comprises generating a signal representative of the absolute value of the second harmonic of said first signal.

61. A method in accordance with claim 59 wherein said step of generating a harmonic restraint signal comprises generating a signal representative of the sum of the absolute value of the second harmonic of said first signal and the absolute value of the fifth harmonic of said first signal.

62. A method in accordance with claim 38 wherein the step of generating a harmonic restraint signal comprises generating a signal representative of the absolute value of the second harmonic of said first signal.

63. The method in accordance with claim 38 wherein said step of generating a harmonic restraint signal comprises generating a signal representative of the sum of the absolute value of the second harmonic of said first signal in the absolute value of the fifth harmonic of said first signal.

64. A transformer differential relay, susceptible to misoperation in the presence of current transformer saturation, said relay comprising:
  (a) means for generating a trip signal; and
  (b) means for generating a harmonic restraint signal coupled to first and second summing, integrating and comparing means for discriminating between said inrush current and said internal fault current, said trip signal generating means responsive to said discrimination to generate said trip signal.

* * * * *